Jan. 13, 1959  V. A. LELOIS  2,868,401
VEHICLE BODY CHANGING METHOD
Filed Feb. 15, 1956  2 Sheets-Sheet 1

INVENTOR.
VERNON A. LELOIS
BY
Charles S. Penfold
ATTORNEY

Jan. 13, 1959   V. A. LELOIS   2,868,401
VEHICLE BODY CHANGING METHOD
Filed Feb. 15, 1956   2 Sheets-Sheet 2
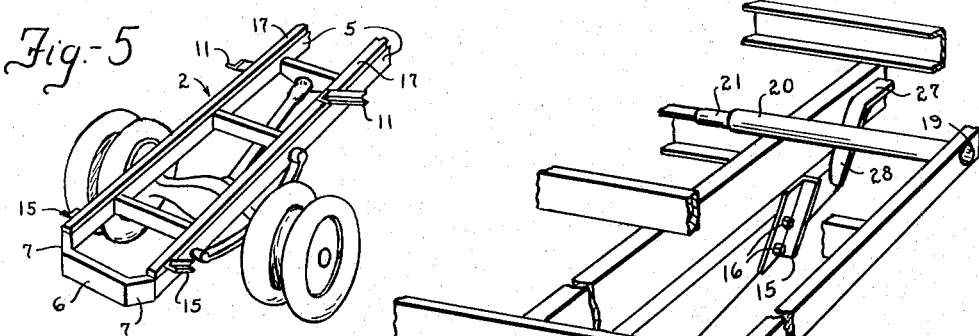
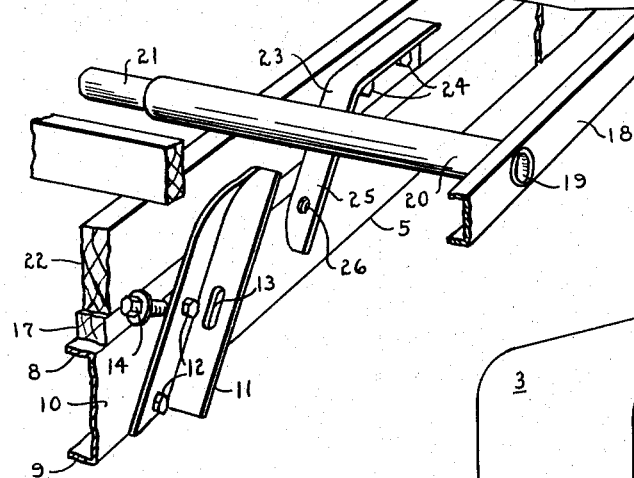
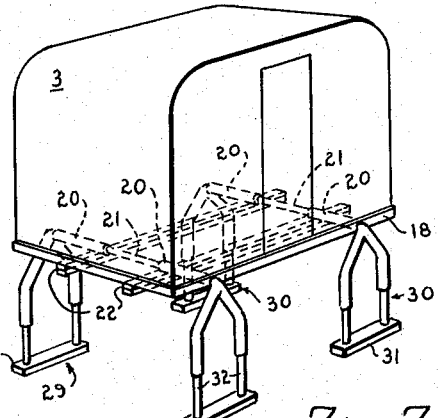
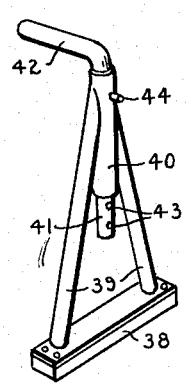
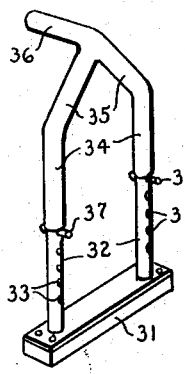
INVENTOR.
VERNON A. LELOIS
BY
Charles S. Penfold
ATTORNEY

United States Patent Office 2,868,401
Patented Jan. 13, 1959

2,868,401
VEHICLE BODY CHANGING METHOD
Vernon A. Lelois, Valparaiso, Ind.

Application February 15, 1956, Serial No. 565,668

1 Claim. (Cl. 214—152)

The invention relates generally to automotive vehicles and more particularly is directed to apparatus and/or a method whereby truck bodies of different shapes or types can be readily detachably connected or supported on a chassis of a vehicle.

It is recognized that various kinds or styles of trucks are being manufactured for different purposes. For example, some are designed and constructed solely for the purpose of transporting a particular commodity or product, such as milk, oil, gravel, lumber, steel and garden produce. In other words, a truck suitable for carrying gravel is not adapted for transporting milk so that under the conventional setup an investment of two trucks is required to transport these commodities.

With the foregoing in mind, the principal object of the subject invention is to provide a vehicle having a chassis and different bodies, either of which can be readily mounted on the chassis, and thereby avoid the cost and maintenance of two vehicles.

More particularly, an object of the invention is to provide the chassis with unique connection means and each of the bodies with connection means which are cooperable with the connection means on the chassis in a manner whereby to assist in holding and/or locking either body to the chassis.

Another object of the invention is to provide each of the bodies with transversely disposed journal means and a plurality of separate standards or supports which are cooperable with the transverse means on a body in a manner whereby the body can be lowered onto a chassis for connection therewith or be raised to disconnect the body therefrom.

A further object of the invention is to provide jack means which is also preferably employed in conjunction with the standards and the bodies to assist in assembling and disassembling each body with respect to the chassis.

A specific object of the invention is to provide means whereby the standards can be readily adjusted or extended to variable lengths or heights.

Additional objects of the invention reside in providing an apparatus comprised of a plurality of components which can be economically manufactured and installed, and one which is durable, stable, efficient, and in which maintenance costs are negligible.

Many other objects and advantages of the invention will become apparent after the description hereinafter set forth is considered in conjunction with the drawings annexed thereto.

In the drawings:

Figure 5 is a perspective view of a major part of the chassis;

Figure 6 is an enlarged perspective view of a portion of the chassis and a part of a body, illustrating certain structural details thereof;

Figure 7 is a perspective view showing a body for milk supported on standards ready for mounting on a chassis;

Figure 8 is a perspective view of one or four corresponding standards or supports utilized whereby to support either of the bodies illustrated; and Figure 9 is a perspective view of a different form of standard which may be employed in lieu of the form shown in Figure 8.

Figure 1:
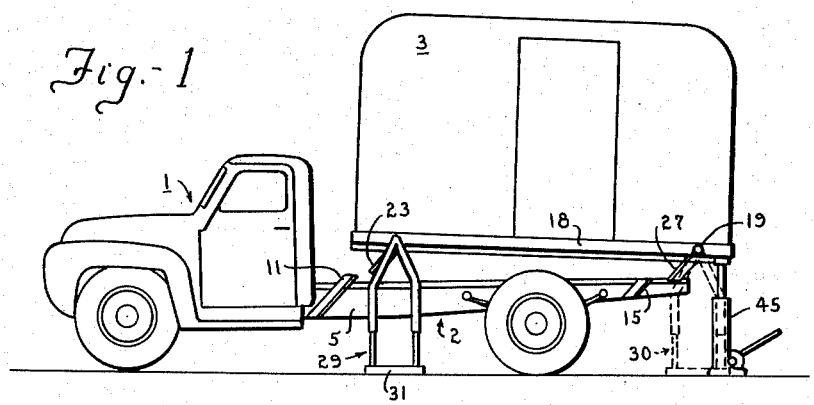
Figure 1 is an elevational side view of a vehicle exemplifying what may be considered as the first step employed in mounting a body, of a type suitable for carrying milk, with respect to the chassis of the vehicle.

Referring first to the structure illustrated in Figures 1 through 6, the vehicle shown is of a conventional type having, among other things, a cab generally designated 1 and a chassis 2 for supporting a body 3 for milk or a body 4 for gravel. The chassis includes a pair of corresponding parallel longitudinally extending side rails or frame members 5 and a rear end rail 6. The side and end rails are preferably joined together by a pair of diagonal rails 7, which assist in piloting or guiding either of the bodies onto the chassis. The rails are preferably of channel cross-section and each side rail includes top and bottom horizontal walls 8 and 9 and a vertical wall 10.

The fore extremity of each of the side rails is provided with an upwardly extending inclined fitting 11, preferably in the form of an angle iron secured to the exterior of the vertical wall of the rail by bolts 12 or the equivalent. The fittings 11, among other things, serve as abutment means for limiting forward movement of either body toward the cab. Each of the fittings is preferably provided with a flat portion having a slot 13 therein through which a fastener in the form of a bolt 14 may be extended to lock either body to the chassis in a manner which will be described subsequently.

The rear extremity of each of the side rails is provided with a fitting 15 which is preferably secured to the exterior of the rail by bolts 16 or the equivalent. These fittings are inclined substantially the same extent as the front fittings 11, but they do not project above the rails, the purpose of which is to prevent their interference with assembling or disassembling either body with the chassis. The front and rear fittings on one rail are located in the same relative positions as the front and rear fittings on the other rail. In other words, the pair of corresponding front fittings 11 and the pair of corresponding rear fittings 15 are longitudinally spaced apart equal distances.

In order to locate either body in a somewhat higher or elevated position on the chassis and at the same time afford sufficient clearance to facilitate assembly and disassembly of either body with the chassis, a runner or spacer 17, such as a wooden 2" x 4" is preferably secured to the top of each of the side rails 5 as depicted in Figure 6. The members 17 also serve to cover structural irregularities in the rails and, for example, cover rivets in the rails, and thereby promote sliding of the body onto the chassis.

The character of the body 3 will now be described. This body is preferably reenforced adjacent its lower portions by a pair of metal channel rub members or bars 18 along its sides. The side wall of each member is provided with a pair of longitudinally spaced round openings 19 within which the outer ends of a pair of cylindrical tubular journal members 20, or pipes of a relatively large diameter, are respectively preferably welded in transverse positions. These tubular members may extend through or below the lower part of the body to reenforce the body. The tubular journal members secured to one bar are aligned with the tubular journal members on the other bar. The rods 21 are respectively secured in the inner ends of the tubular members to permanently locate the tubular members in their proper positions. The tubular members and tie members are disposed substantially within the confines of the body or in positions which do not interfere with the use of the body or detract from its general all around appearance.

The underside of the body 3 is provided with a pair of corresponding parallel longitudinally extending beams or runners 22 which are spaced apart the same distance as the rails 5 of the chassis for support thereon. The fore extremity of the exterior side of each of the beams is provided with a fitting 23 having a horizontal portion attached to the beam by bolts 24 or equivalent means, and a depending inclined portion 25 adapted for disposition alongside a rail of the chassis. The depending portions 25 of these fittings are inclined at the same angle as the front fittings 11 on the rails and are adapted for abutment therewith to limit forward and upward movement of the body with respect to the chassis. The depending portion 25 of each of the upper front fittings 23 is preferably provided with an aperture 26 as shown. A bolt 14, above referred to, is adapted for entry through each of these apertures and each of the slots 13 in the lower front fittings 11 on the rails for locking the body against rearward movement on the chassis, if desired.

The rear extremity of each of the beams 22 on the body is provided with a rear fitting 27, similar to the front fitting, and has a depending portion 28 for disposition alongside a rail of the chassis. The rear fittings 27 are adapted for abutment with the rear fittings 15 on the rails of the chassis in substantially the same manner that the fittings 23 on the body abut the fittings 11 on the chassis.

It is thus apparent that the body is provided with a pair of front fittings 23 and a pair of rear fittings 27 which straddle the rails of the chassis and that the front fittings 11 on the chassis extend upwardly and straddle the beams 22 on the body for the purpose of guiding the body during assembly and disassembly thereof with the chassis and obtain a stabilized connection therebetween.

Attention is directed to the fact that all of the fittings on the chassis and body constitute connection means which are located inwardly and do not interfere with the tubular journal members 20.

Various means may be utilized to mount the body 3 onto the chassis and remove it therefrom, but as described herein, four corresponding standards or journal supports are preferably employed for this purpose. A front pair 29 are used to support the forward extremity of the body and a rear pair 30 for supporting the rear extremity of the body as depicted in Figures 1 and 7.

The standards may be constructed in various ways as shown in Figures 8 and 9. The standard shown in Figure 8 includes a base 31, a pair of upstanding parallel posts 32 provided with holes 33, and a movable member having a pair of parallel tubular sections 34 respectively telescopically receiving the posts 32. The tubular sections constitute furcations which are joined together by converging angularly disposed portions 35 and a horizontal shaft 36 extends laterally from the junction between the angular portions 35. The movable member may be readily adjusted to any height on the posts by merely raising or lowering the member and inserting stop pins 37 into the holes 33 in the posts as shown in Figure 8. The shafts 36 are respectively adapted for disposition in the tubular journal members 20 for pivotal movement therein in a manner which will be described in detail subsequently.

The standard shown in Figure 9, which may be used in lieu of the standard depicted in Figure 8, includes a base 38, a pair of upstanding posts 39 joined at their upper ends with a vertical tubular member 40 therebetween. This tubular member telescopically receives a movable member and has a portion 41 disposed in the tubular member and a horizontal shaft portion 42. The portion 41 is preferably provided with a plurality of holes 43 and the tubular member with a pin 44 which can be placed in any one of the holes to adjustably secure the movable member at any height permitted by the spaces between the holes. The pin also serves to prevent relative rotational movement between the movable member and the tubular member 40.

The method or steps employed in mounting the body 3 onto the chassis 2 is relatively simple and will now be described. The body, as alluded to above and as depicted in Figure 7, is supported at its forward extremity by the standards 29 and its rear extremity by the standards 30, the latter preferably being adjusted to place the rear extremity of the body in a somewhat lower position than its forward extremity. The body is thus inclined with respect to the horizontal and when in this position, as illustrated in Figure 1, a vehicle provided with the chassis 2 is backed up so that the chassis is disposed directly under the body. More specifically in this regard, the vehicle or truck is backed up to a point where the pairs of fittings 23 and 27 on the body are located rearwardly of and above the pairs of fittings 11 and 15 on the chassis and so that the rails 5 of the chassis are aligned with the beams 22 on the underside of the body.

Figure 2:
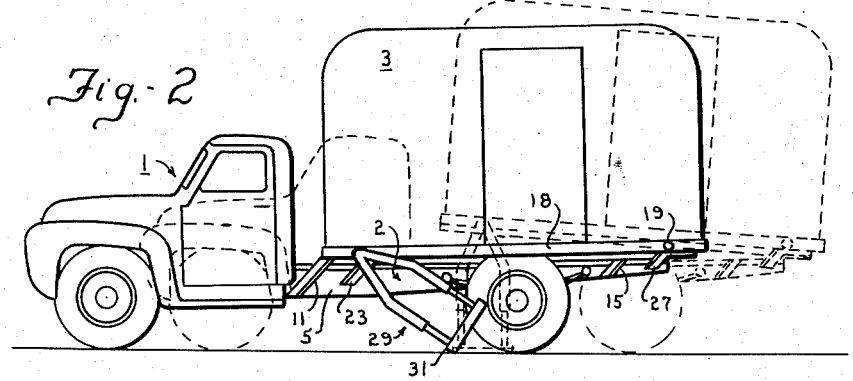
Figure 2 is an elevational side view illustrating the second and third steps in mounting the body onto the chassis.
Figure 3:
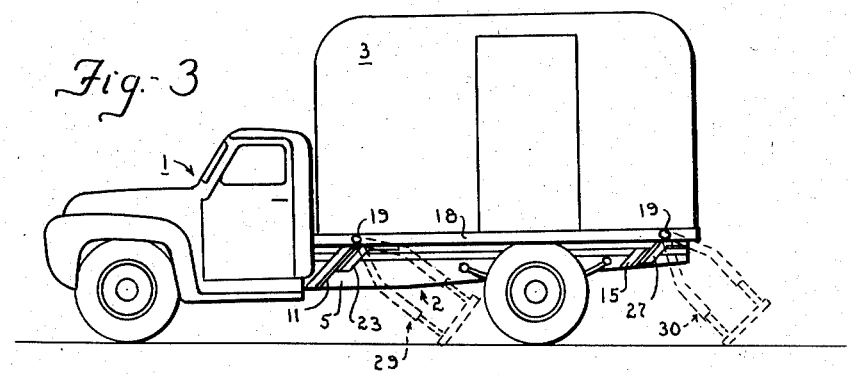
Figure 3 is an elevational side view depicting the fourth step in placing the body on the chassis.
Figure 4:
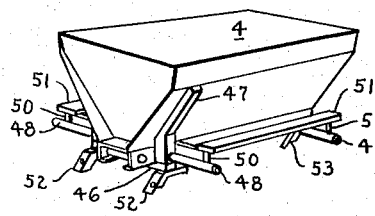
Figure 4 is a perspective view showing a different body, such as one suitable for transporting gravel or lime, adapted for support on the chassis in place of the body for milk.

After the body and chassis are thus positioned, a heavy duty jack means 45, as depicted in Figure 1, is placed under the rear extremity of the body between the rear standards 30 and operated to lift the body. The rear standards are then removed and the jack is again operated to lower the rear extremity of the body onto the chassis. The truck is then driven forwardly and this causes the front standards to tilt forwardly and gradually lower the forward extremity of the body toward and onto the rails as depicted in Figure 2. The rear pair of standards are then reconnected with the body and placed in a corresponding inclined position with the front pair of standards, so that the truck can be backed up again in order to place the fittings on the body against the fittings on the chassis, after which bolts 14 can be inserted through the slots 13 and apertures 26 in the front fittings on the body and chassis for positively locking the body to the chassis to prevent relative longitudinal movement therebetween and so that the fittings on the body, by straddling the chassis rails and the front fittings on the rails straddling the beams 22 on the body will stabilize the position of the body and substantially prevent lateral shifting thereof relative to the chassis.

Attention is directed to the fact, that the rear extremity of the chassis, in substantially all vehicles of the truck type, is somewhat higher than its forward extremity, so that the body 3, due to its weight, tends to normally move forward toward the cab. This factor also assists in maintaining the body in its proper place without using the locking bolts 14. This forward thrust of the body 3 in combination with the angular disposition of the fittings serves to retain the body on the chassis under all known operating conditions. More specifically in this regard, this setup prevents upward and forward thrusts of the body once it is properly mounted on the chassis.

To remove the body 3 from the chassis the bolts 14 are detached, if used, and the steps for mounting the body are substantially reversed.

The body 4 for gravel or lime is preferably supported by another set of standards utilized to support the body 4 in a position like the body 3 in Figure 7.

The forward extremity of the body 4, adjacent its underside, is provided with a plurality of longitudinally spaced transverse members or stringers 46 which are adapted to rest on the spacers 17 carried by rails 5 of the chassis 2. The forward extremity of the body is preferably reenforced by a pair of braces 47 secured to the sides of the body. A front pair of tubular journal supports 48 have their inner ends joined to the braces, preferably by welding. A rear pair of tubular journal supports 49, substantially corresponding to the supports 48, are supported on the body. The journal supports are anchored in place and if desired may be reenforced by connection with brackets 50 extending from the body which carry planks 51.

The forward extremity of the body 4 is also provided with a pair of front fittings 52 and the rear extremity with a pair of rear fittings 53, which pairs substantially respectively correspond to the pairs 23 and 27 on the body 3 for straddling the rails 5 of the chassis and for engagement with the fittings 11 and 15 in the same general way that the fittings on the body 3 engage the latter fittings. The front fittings 52 on the body 4 may be detachably connected to the front fittings 11 on the chassis by bolts, or other suitable means, if so desired. When the body 4 is not loaded it is desirable to lock it on the chassis by bolts or other means.

The body 4 is adapted for assembly and disassembly with respect to the chassis 2 in substantially the same manner as the body 3. It is to be understood that if found desirable, the rear fittings on the chassis and the rear fittings on either body can be detachably secured together in substantially the same manner as the front fittings.

In view of the foregoing it will be manifest that improved means have been provided whereby at least two different bodies may be detachably connected with the chassis of a single vehicle. Obviously, additional forms of bodies can be similarly provided with journal supports and fittings for connection with the chassis 2. The arrangement thus affords a setup whereby one vehicle, in lieu of a plurality, may be readily converted to carry different bodies for different commodities and thereby materially reduce the initial cost of a plurality of automotive vehicles and the maintenance costs connected therewith.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

A method of assembling a body provided with fittings to a vehicle chassis provided with fittings which consists in mounting the body on a front pair of standards and a rear pair of standards, moving the chassis rearwardly under the body and between the standards, raising the rear end of the body, disconnecting the rear pair of standards from the body, lowering the rear end of the body onto the rear end of the chassis, moving the chassis forwardly to cause tilting of the front pair of standards to gradually lower the fore end of the body onto the chassis, reconnecting the rear standards to the body so they assume a tilted position substantially corresponding to that of the front standards, and then moving the chassis rearwardly so that the standards will force the body forwardly so that the fittings thereon will engage the fittings on the chassis.

References Cited in the file of this patent

UNITED STATES PATENTS

| Number | Name | Date |
|---|---|---|
| 1,049,210 | Cole | Dec. 31, 1912 |
| 1,122,686 | Clark et al. | Dec. 29, 1914 |
| 1,303,854 | Clark | May 30, 1919 |
| 1,451,633 | Smith | Apr. 10, 1923 |
| 1,615,532 | Baxter | Jan. 25, 1927 |
| 1,802,220 | Romine | Apr. 21, 1931 |
| 1,804,542 | Perin | May 12, 1931 |
| 1,875,052 | Ljungkull | Aug. 30, 1932 |
| 2,044,592 | Richards | June 16, 1936 |
| 2,539,201 | Pasko | Jan. 23, 1951 |
| 2,555,336 | Hagely | June 5, 1951 |
| 2,656,942 | Helms | Oct. 27, 1953 |